(12) United States Patent
Tzonev et al.

(10) Patent No.: US 8,776,596 B2
(45) Date of Patent: Jul. 15, 2014

(54) APPARATUS FOR THE MONITORING OF FLOATING ROOF POSITION FOR STORAGE TANK ROOFS

(76) Inventors: Nikolay Nikolov Tzonev, Victoria (CA); Dale John Shpak, North Sannich (CA); David William Sime, Victoria (CA); Kevin James Gans, Victory (CA)

( * ) Notice: Subject to any disclaimer, the term of this patent is extended or adjusted under 35 U.S.C. 154(b) by 388 days.

(21) Appl. No.: 13/247,803

(22) Filed: Sep. 28, 2011

(65) Prior Publication Data
US 2012/0073367 A1 Mar. 29, 2012

Related U.S. Application Data

(60) Provisional application No. 61/387,201, filed on Sep. 28, 2010.

(51) Int. Cl.
  *G01F 23/32* (2006.01)
  *G01F 23/34* (2006.01)
(52) U.S. Cl.
  CPC ..................................... *G01F 23/34* (2013.01)
  USPC ............................................................ 73/317

(58) Field of Classification Search
  CPC ................................. G01F 23/34; B65D 88/34
  USPC ............................................................ 73/317
  See application file for complete search history.

(56) References Cited

U.S. PATENT DOCUMENTS

2007/0205907 A1\* 9/2007 Schenk ......................... 340/623

\* cited by examiner

*Primary Examiner* — Peter Macchiarolo
*Assistant Examiner* — Tamiko Bellamy
(74) *Attorney, Agent, or Firm* — Davis & Bujold, PLLC; Michael J. Bujold

(57) ABSTRACT

A floating storage tank roof having a roof cover level monitor apparatus uses a flexible rod having a first end in contact with the storage tank cover bottom surface and a second end in contact with a base mounted to the top of the storage tank roof. As the rod flexes the second end of the rod is pushed into a slot within the base and against a resilient member within the slot. Within the slot are disposed proximity switches. As the rod second end sinks into the slot the proximity switches are actuated by mechanical or magnetic means. The spacing of the switches within the slot is calibrated to represent the level of the storage tank roof. A force transducer may also be used in lieu of the switches.

11 Claims, 6 Drawing Sheets

APPARATUS FOR THE MONITORING OF FLOATING ROOF POSITION FOR STORAGE TANK ROOFS

CROSS REFERENCE TO RELATED APPLICATIONS

This application claims the benefit of U.S. Provisional Patent Application No. 61/387,201 for "An Apparatus for the Monitoring of Floating Roof Position for Storage Tank Roofs" filed in the USPTO on Sep. 28, 2010 by the present inventors.

FEDERAL SPONSORED RESEARCH

N/A

FIELD OF THE INVENTION

This invention relates to the monitoring of the position of the floating roofs of storage tanks, including tanks used for storing liquid petroleum products or other chemicals. Specifically this invention relates to an apparatus for the monitoring of floating roof position for storage tank roofs. This invention can be used to generate alarm or warning signals when the position of the roof exceeds selected limits. This invention can be connected to a monitoring or alarm system using wired or wireless means. Further, the utility of this invention can be extended by including a liquid-level sensor that indicates the level of any fluids on the tank roof.

BACKGROUND OF THE INVENTION

Large storage tanks are often cylindrical and have a circular floating roof. The roof floats on the surface of the liquid, thereby decreasing the vapor space inside of the tank. A floating roof may be required for reasons of safety or for pollution reduction. The floating roof has a seal to seal it to the wall of the tank that helps to prevent the escape of the contained liquid or vapors from that liquid.

There are two broad types of storage tanks that utilize floating roofs: tanks having an exposed floating roof and tanks having a fixed roof covering the floating roof. An advantage of the covered tank is that it protects the floating roof from undesirable effects from the external environment, such as rain or birds. A disadvantage of the covered tank is that volatile, explosive, corrosive, or toxic gasses or liquids can accumulate between the floating roof and the fixed roof.

When the storage tank is being filled, it is critically important to ensure that the level of the roof does not exceed the maximum level that is safe for that tank since exceeding that level can damage seals or cause the release of tank contents. The overfilling of tanks is the leading cause of tank-related disasters, such as fires. To prevent such disasters, safety-related organizations such as the American Petroleum Institute mandate the monitoring of tank roofs.

There are several existing methods for monitoring the limits of the tank level, such as a mechanical limit switch or a rod and plunger with a magnetic reed switch (ref. American Petroleum Institute 2350, Overfill Protection for Storage Tanks in Petroleum Facilities, Third Edition). All of these methods require that the monitoring device be affixed to the cover of the tank.

The level of any liquid on the roof of the tank is also of interest. With covered tanks, any liquid would likely be liquid that has escaped from the sealed interior of the tank whereas with uncovered tanks, the liquid could be rainwater or escaped liquid. If liquid is newly detected or if the liquid level is changing when the tank is being filled or emptied (i.e., when the roof is moving) then the contained liquid is likely escaping through the tank seals. The liquid level sensor is also useful for detecting that the tank has been overfilled.

SUMMARY OF THE INVENTION

The present invention provides a new apparatus for monitoring the position of the tank roof wherein a semi-rigid or flexible rod is used to actuate the mechanical or proximity switches that are used to indicate warning or alarm conditions. The semi-rigid rod can easily be cut to the required length during installation, thereby making the invention easy to install. This apparatus can be designed to be mounted on the cover of the tank or on the roof of the tank.

The utility of this invention can be extended by including a liquid-level sensor that indicates the level of any fluids on the tank roof.

In one embodiment of the invention there is provided an apparatus for monitoring the level of a floating storage tank roof having a semi-rigid rod and a spring to control the actuation of a plurality of switches. Each switch is a proximity switch that is used to indicate a particular level of the roof. The state of the switch is transmitted by one of hard-wire or wireless means to a monitoring or alarm system. The switches can be one of a mechanical switch or a magnetic switch.

In a further embodiment of the invention there is provided a liquid-level sensor.

In yet another embodiment of the invention the wireless means for communicating the status of the switch is mounted upon or within the rod.

In still another embodiment of the invention the apparatus the rod is connected to a force transducer. The force transducer can measure a continuum of storage tank levels once the rod has contacted the cover of the tank. Wired or wireless means can be used to communicate the signal from the force transducer to a monitoring or alarm system.

BRIEF DESCRIPTION OF THE DRAWINGS

FIG. 1A is a schematic illustration of one embodiment while

DESCRIPTION OF THE INVENTION

Figure 1A:
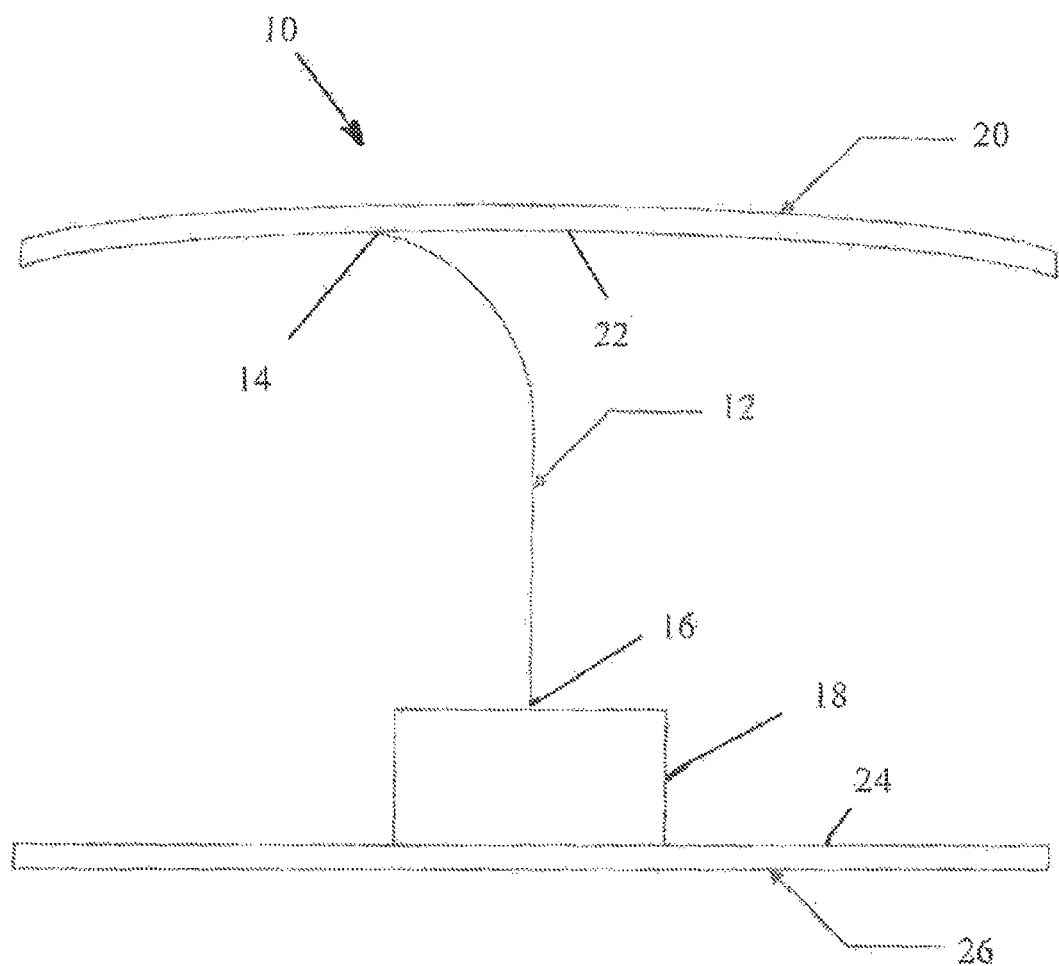

With reference to FIG. 1A, there is illustrated one embodiment of our invention, namely, an apparatus for the monitoring of floating roof position for storage tank roofs. In this embodiment the invention the apparatus is mounted to the surface 24 of a storage tank roof 26. The invention 10 comprises a semi-rigid (or flexible) rod 12 having a first end 16 connected to a base unit 18 and a second end 14 in contact with the underside 22 of a storage tank roof cover 20.

Figure 1B:
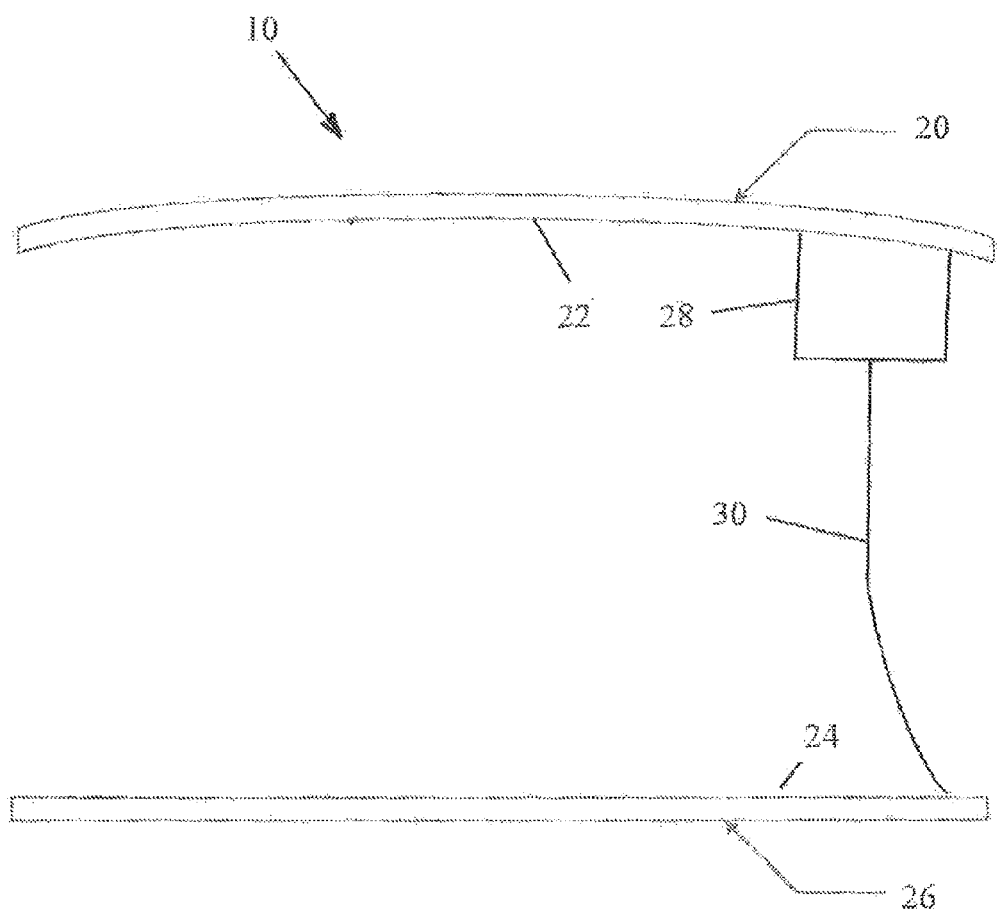
FIG. 1B is a schematic illustration of a second embodiment of the invention.

With reference to FIG. 1B, in another embodiment of the invention the base 28 may be mounted to the underside surface 22 of the cover 20 with rod 30 in contact with the top surface 24 of the storage tank roof 26.

One advantage of the invention is that the use of the semi-rigid rod prevents damage to the cover 20 over the storage tank. A second advantage of using a semi-rigid rod is that the base unit 18 is not physically stressed at the connection 16 if the rod is overloaded. A third advantage of using the semi-rigid rod is that by combining the rod with force transducers, as further described below, the apparatus can obtain a continuum of level measurements. The semi-rigid rod can be made of a carbon fiber having known flexural properties and therefore it can be calibrated to storage tank level. The length of the rod can be varied to suit the installation.

Figure 2:
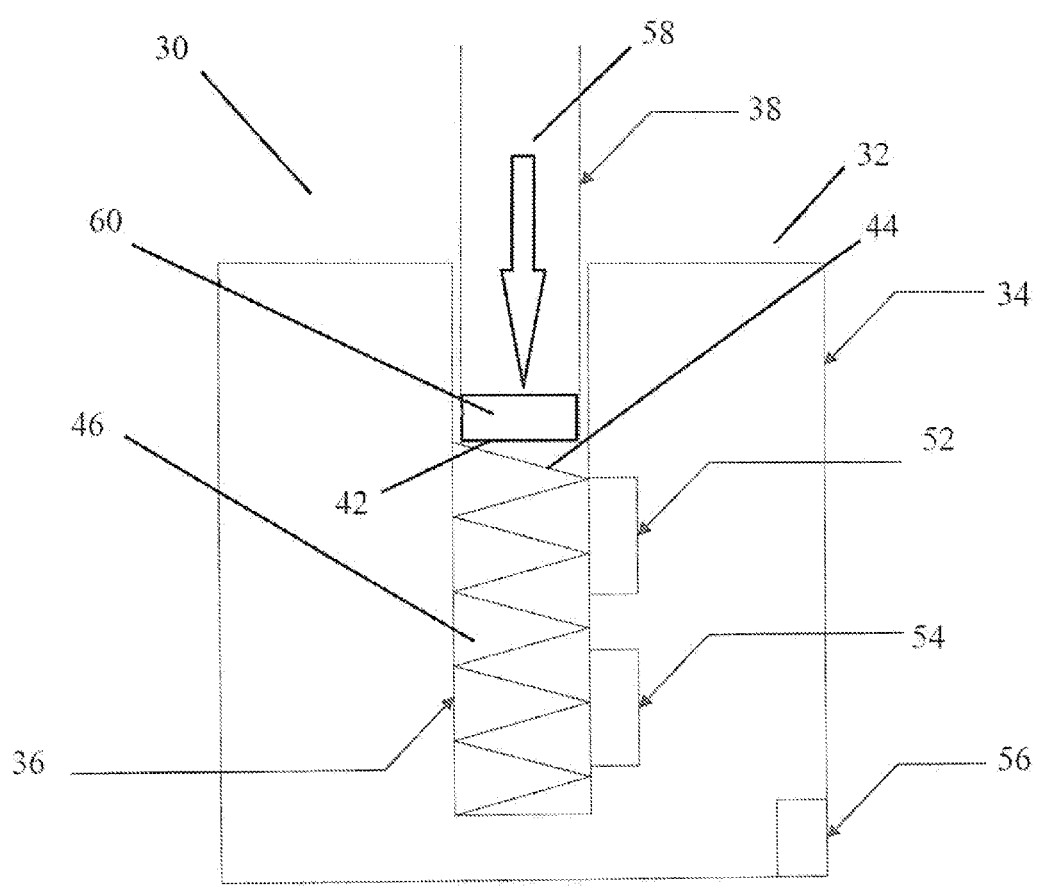
FIG. 2 is a schematic illustration of the base unit of one embodiment of the invention.

Referring now to FIG. 2, there is shown another embodiment of the invention 30. The base unit 32 comprises a mechanical housing 34 having a slot 36 into which the flexible rod 38 is inserted. The bottom end of the rod 42 is disposed over and in communication with the top end 44 of a resilient member 46. The opposite end of the rod, which is not illustrated, is in contact with the storage tank roof cover as shown in FIG. 1A. Within the side 50 of the slot 36 are disposed at least one mechanical switch 52. The embodiment illustrated shows two switches 52 and 54. An optional liquid-level sensor 56 is also shown in this embodiment to ensure the base of the apparatus is level with respect to the roof surface upon which it is placed.

In operation, a force 58 is exerted onto the flexible rod 38 caused by rising (or falling) levels in the storage tank and the resultant changes in the distance between the rod top contact point being the bottom surface of the storage tank roof and the bottom rod contact point 42 being the contact point between the rod bottom end 42 and resilient member 46. The force 58 exerted on the rod is transferred to the resilient member 46. This will cause the bottom end of the rod 42 to be pushed deeper into the slot 36. The necessary force to compress the resilient member 46 is less than the force exerted on the rod so that if the rod top end comes into contact with a sloping portion of the storage tank cover it will still transfer a force to the resilient member 46. The resilient member is also sufficiently still so that the weight of the rod itself will not compress the spring causing a spurious signal from the switches 52 and 54.

Still referring to FIG. 2 and in one embodiment of the invention, the proximity switches 52 and 54 are magnetic reed switches triggered by magnet 60 disposed on the end of the rod. In another embodiment of the invention, the switches can be capacitive-type switches. Furthermore, while the illustrated embodiment shows two switches 52 and 54, at least one switch is necessary and more than two switches can be installed in the slot to suit a particular application.

As forces front the Semi-rigid Rod 1 compress the Spring 7, the Magnet 9, which is affixed to the Semi-rigid Rod 1, first actuates the uppermost Switch 6a. Further compression of the Spring 7 results in the actuation of Switch 6b. As an example, the actuation of Switch 6a could be used to generate a warning signal whereas the actuation of Switch 6b could indicate a critical alarm signal. For simplicity in FIG. 3, the Magnet 9 is shown mounted at the end of the Semi-Rigid Rod 1, but it could be mounted at any convenient location along the Rod.

Figure 3:
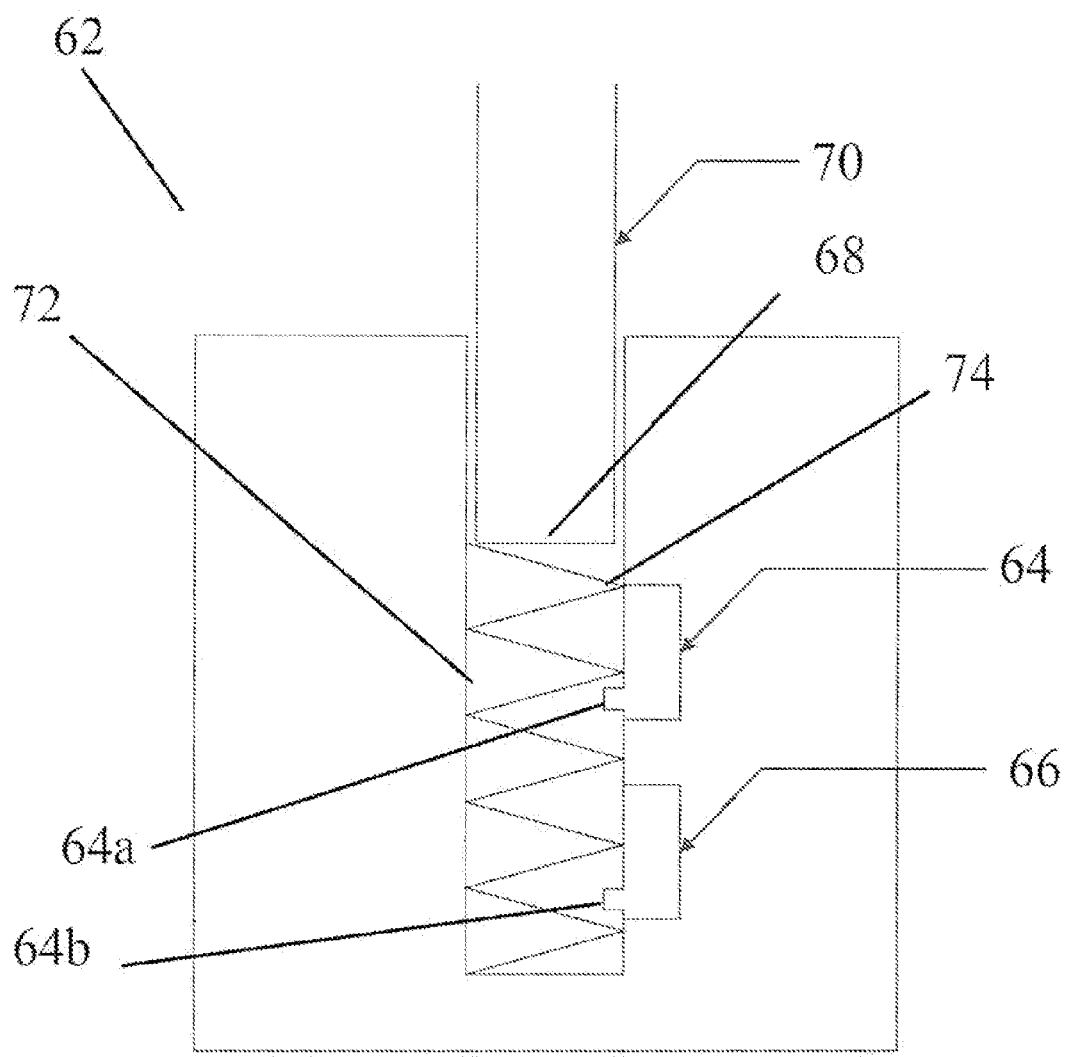
FIG. 3 is a schematic illustration of a multi-position mechanical switch of still another embodiment of the invention.

FIG. 3 illustrates an alternative embodiment of the invention 62 shows an alternative embodiment using mechanical switches 64 and 66 instead of proximity switches. As the bottom end 68 of rod 70 is pushed further into slot 72 compressing the resilient member 74 the tabs 64a and 64b are encountered and flipped to turn the respective switch 64 and 66 on.

In all of the embodiments of the invention illustrated herein, the number of switches disposed within the slot will determine the sensitivity of the level measurement. More switches will lead to a more accurate and refined measurement of the roof level. The spacing of the switches can be fixed at the time of manufacture or at the time of deployment.

Figure 4:
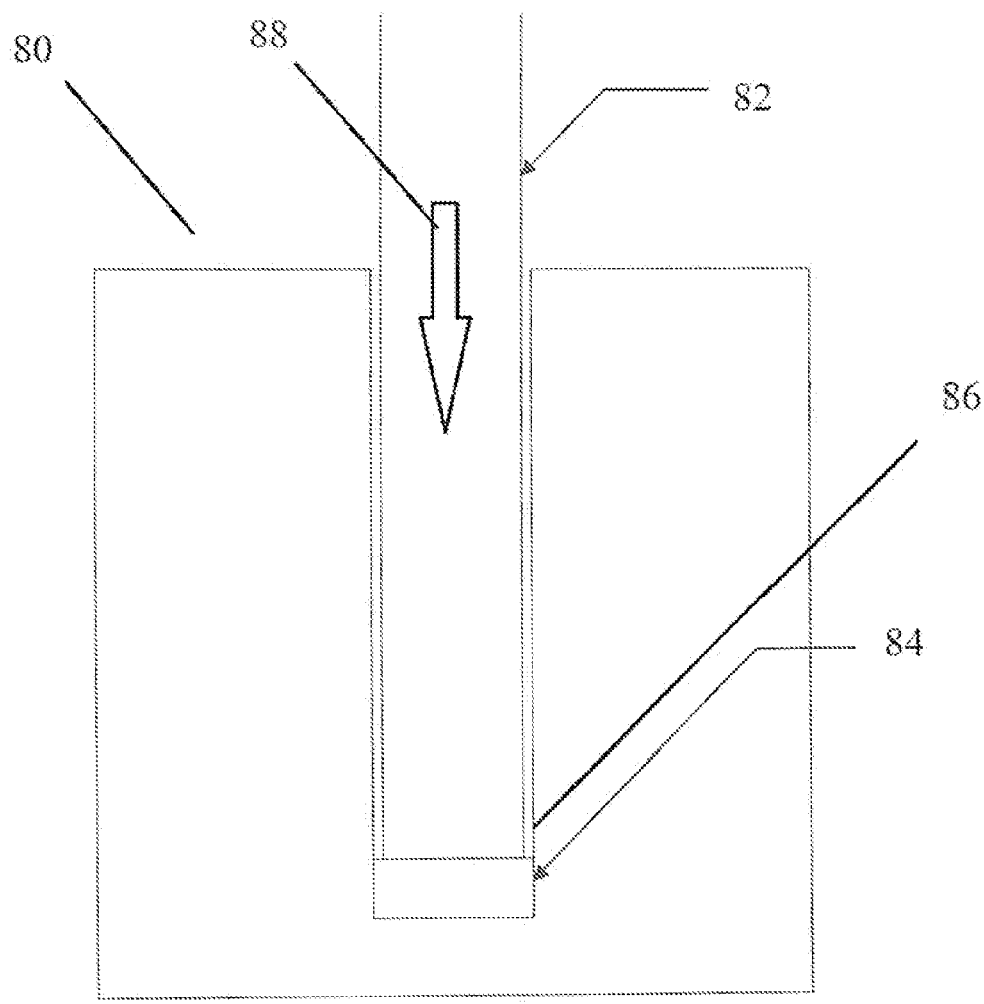
FIG. 4 is a schematic illustration showing an embodiment of the invention using a force transducer.

Referring now to FIG. 4, there is illustrated another embodiment of the invention 80 that relies on the known flexural and mechanical properties of the rod 82 and a force transducer 84. The force transducer is mounted at the bottom of the slot 86 and the base of the rod 82 is in contact with the top surface of the transducer. Force 88 generated within the rod is transmitted to the force transducer. The rod and transducer are calibrated to that flexure of the rod and force exerted on the transducer is equated to a level of the storage tank roof. Since there are no moving parts in this embodiment, the resulting signal can represent a continuum of storage tank levels from the moment the top of rod is in contact with the storage tank cover bottom surface.

Figure 5:
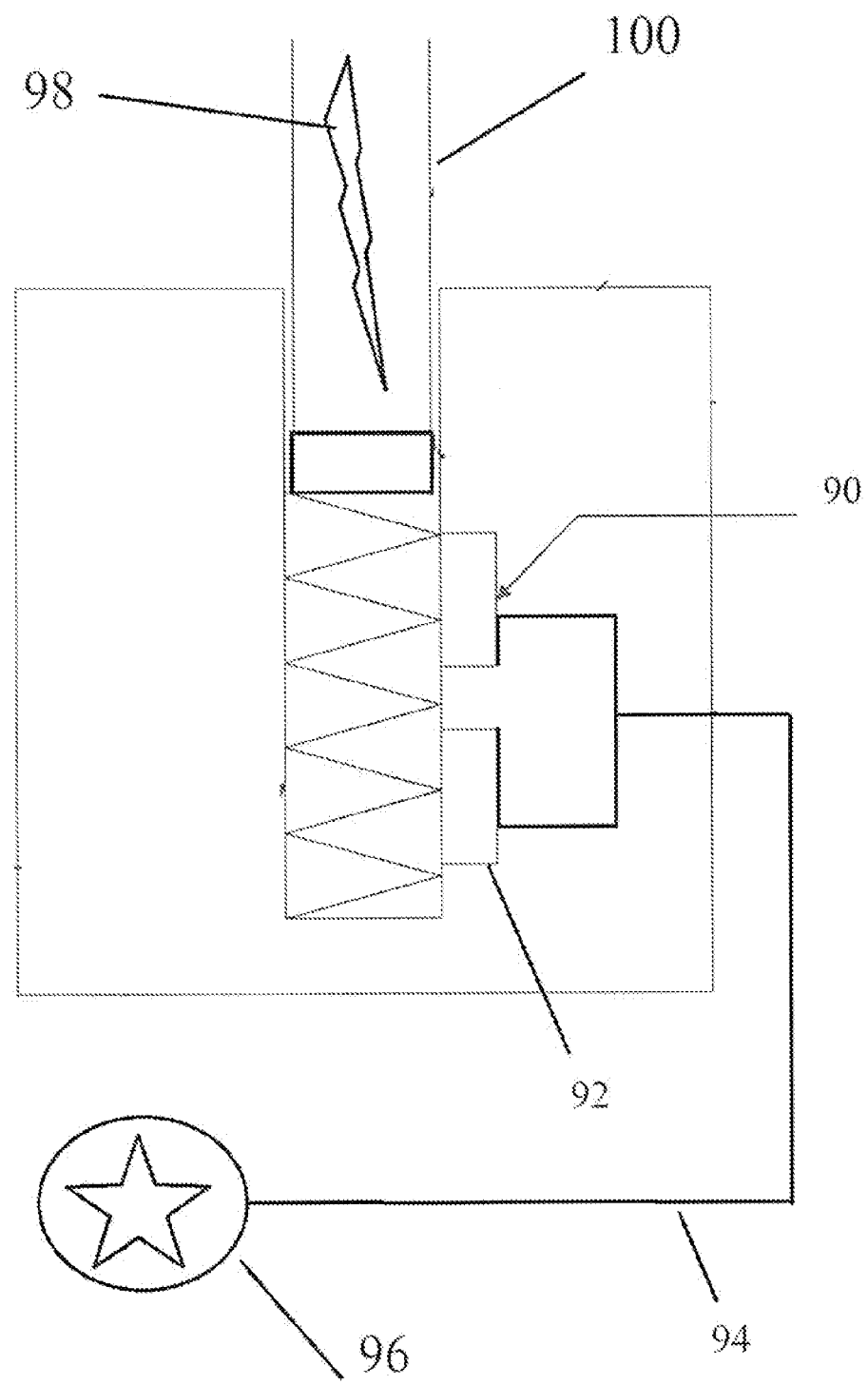
FIG. 5 is a schematic illustration of signal transmission means.

Referring now to FIG. 5, the output from the switches 90 and 92 can be connected 94 to a monitoring or alarm system 96 using wired or wireless means. When used in a wireless system, an antenna 98 can be affixed to or integrated into the semi-rigid rod 100 so that the signal from the switches can be remotely monitored.

Although the description above contains many variations and embodiments, these should not be construed as limiting the scope of the invention but merely as providing illustrations of some of the several embodiments of the invention. Thus the scope of the embodiments should be determined by the appended claims and their legal equivalents rather than by the example given.

What is claimed is:

1. An apparatus for monitoring the level of a floating storage tank roof having a cover, said apparatus comprising;
   a. a flexible rod having a first end for contacting a bottom surface of said cover and a second end disposed within;
   b. a base comprising a housing and a slot within said housing for accepting said second end;
   c. a resilient compressible member disposed within said slot, said resilient compressible member having a top end and a bottom end;
   d. wherein the second end of said flexible rod is in contact with said resilient compressible member top end;
   e. wherein the flexible rod second end is capable of sliding movement within the slot;
   f. position sensing means disposed and regularly spaced within the slot for detecting the position of the rod second end during said sliding movement;
   g. signal generation means connected to said position sensing means for generating a rod second end position signal;
   h. signal transmission means connected to said signal generation means for transmitting said rod second end position signal to a remote monitoring station;
   i. means for converting the rod second end position signal to a human detectable annunciation; and,
   j. signal conversion means for converting the second end position signal to a corresponding level of the storage tank roof.

2. The apparatus of claim 1 wherein said position sensing means comprises at least one switch actuated by the rod second end.

3. The apparatus of claim 1 wherein the position sensing means comprises at least two switches.

4. The apparatus of claim 1 wherein said signal transmission means is a hard wire to said remote station.

5. The apparatus of claim 1 wherein the signal transmission means is wireless means.

6. The apparatus of claim 1 wherein the position sensing means comprises a proximity switch that is actuated by the rod second end.

7. The apparatus of claim 6 wherein said proximity switch is a mechanical switch.

8. The apparatus of claim 6 wherein the proximity switch is a magnetic switch actuated by a magnet fixed to the flexible rod second end.

9. The apparatus of claim 1 further including a liquid-level sensor for detecting an inclination of the base.

10. The apparatus of claim 5 wherein the wireless means includes an antenna.

11. The apparatus of claim 10 wherein said antenna is mounted within the flexible rod.

* * * * *